US009440451B2

United States Patent
Bai et al.

(10) Patent No.: US 9,440,451 B2
(45) Date of Patent: Sep. 13, 2016

(54) 2-D STRAIGHT-SCAN ON IMAGING SURFACE WITH A RASTER POLYGON

(71) Applicant: PRYSM, Inc., San Jose, CA (US)

(72) Inventors: Hanxiang Bai, San Jose, CA (US); Roger A. Hajjar, San Jose, CA (US)

(73) Assignee: PRYSM, Inc., San Jose, CA (US)

( * ) Notice: Subject to any disclaimer, the term of this patent is extended or adjusted under 35 U.S.C. 154(b) by 0 days.

(21) Appl. No.: 14/721,013

(22) Filed: May 26, 2015

(65) Prior Publication Data

US 2015/0352859 A1 Dec. 10, 2015

Related U.S. Application Data

(63) Continuation of application No. 13/245,655, filed on Sep. 26, 2011, now Pat. No. 9,041,762.

(51) Int. Cl.
| | | |
|---|---|---|
| B41J 2/47 | (2006.01) |
| H04N 3/23 | (2006.01) |
| G02B 5/09 | (2006.01) |
| G02B 26/10 | (2006.01) |
| G03G 15/04 | (2006.01) |
| G02B 26/12 | (2006.01) |
| H04N 9/31 | (2006.01) |
| G02B 27/00 | (2006.01) |

(52) U.S. Cl.
CPC .................. *B41J 2/471* (2013.01); *G02B 5/09* (2013.01); *G02B 26/101* (2013.01); *G02B 26/125* (2013.01); *G02B 27/0031* (2013.01); *G03G 15/0409* (2013.01); *H04N 3/23* (2013.01); *H04N 9/3129* (2013.01); *Y10T 29/49826* (2015.01)

(58) Field of Classification Search
USPC .................. 347/230, 231, 241–246, 256–261
See application file for complete search history.

(56) References Cited

U.S. PATENT DOCUMENTS

| 4,400,063 A | * | 8/1983 | Hayashida | G02B 9/34 359/206.1 |
| 4,934,772 A | | 6/1990 | Sakuma et al. | |
| 5,086,350 A | * | 2/1992 | Nishihata | G02B 13/0005 359/205.1 |
| 6,219,168 B1 | * | 4/2001 | Wang | G02B 5/09 347/243 |
| 6,292,285 B1 | | 9/2001 | Wang et al. | |
| 7,869,112 B2 | * | 1/2011 | Borchers | G02B 26/123 359/216.1 |
| 8,355,058 B2 | | 1/2013 | Shirai | |

FOREIGN PATENT DOCUMENTS

| CN | 102084281 A | 6/2011 |
| JP | 10293262 A | * 11/1998 |
| WO | 2010/012003 A2 | 1/2010 |

OTHER PUBLICATIONS

Combined Search and Examination Report for Application No. GB1216753.2 dated Jan. 18, 2013, 7 total pages.
Chinese Office Action (with attached English translation) for Application No. 201210377602.X dated Jul. 1, 2014; 25 total pages.

* cited by examiner

*Primary Examiner* — Bradley Thies
(74) *Attorney, Agent, or Firm* — Patterson & Sheridan, LLP

(57) ABSTRACT

A 2-D scanning system uses a fast-rotating raster-polygon as a single scanning component to produce straight scan lines over a 2-D image surface. An approach angle of incident light beams to the raster-polygon is selected to minimize pin-cushion distortion of scan lines introduced by polygon scanning on the image surface, and a tilt angle of the rotational axis of the raster-polygon is selected to position said polygon-scanning distortion symmetrically on the image surface. In addition, scan optics are configured to generate a predetermined amount of barrel distortion of scan lines on the image surface to compensate for pin-cushion distortion introduced by polygon scanning.

13 Claims, 11 Drawing Sheets

2-D STRAIGHT-SCAN ON IMAGING SURFACE WITH A RASTER POLYGON

CROSS-REFERENCE TO RELATED APPLICATIONS

This application is a continuation of co-pending U.S. patent application Ser. No. 13/245,655, filed Sep. 26, 2011, now issued as U.S. Pat. No. 9,041,762, which is herein incorporated by reference.

BACKGROUND OF THE INVENTION

1. Field of the Invention

Embodiments of the present invention relate generally to laser-based image-generating systems and, more specifically, to systems for producing 2-D straight-line scanning on an imaging surface using a raster polygon and a method of forming the same.

2. Description of the Related Art

In laser-based image-generating systems, a rotating polygon mirror is commonly used to scan one or multiple laser beams across an image-generating surface, such as the light-sensitive drum of a laser photo-copier or the phosphor screen of a laser-phosphor display. A rotating polygon mirror is a multi-faceted optical element having a plurality of reflective surfaces. A laser beam incident on one of the reflective surfaces is directed to the image-generating surface, and as the polygon rotates, the incident laser beam sweeps across the image-generating surface, thereby producing one line of an image on the image-generating surface.

In some devices, a specialized rotating polygon mirror, known as a raster polygon mirror, is used to produce 2-dimensional scanning of lasers across the image-generating surface. In a raster polygon mirror, each reflective surface is canted at a different angle. As with a rotating polygon mirror, when the raster polygon mirror rotates, a laser beam incident on a reflective surface of the raster polygon beam sweeps across the image-generating surface to produce a line of an image on the image-generating surface. However, as each subsequent reflective surface rotates through the incident laser beam, the beam is directed to and sweeps across a different location on the image-generating surface, thereby performing 2-dimensional scanning of the laser across the image-generating surface. Thus, a raster polygon mirror allows a laser to be scanned across a 2-dimensional surface using a single moving component, thereby facilitating high-speed laser imaging technologies.

A drawback to using a raster polygon mirror for scanning lasers across an image-generating surface is that the lasers so directed do not follow straight lines across the image generating surface. Instead, the scan lines of the lasers have significant curvature, which greatly complicates image processing and timing. In addition, each distinct canted reflective facet of a raster polygon mirror produces a corresponding distinct curvature, producing noticeable and undesirable distortion of images produced on the image-generating surface, as illustrated in FIG. 1. FIG. 1 illustrates curved laser scan lines 101-109 produced on an imaging surface 99 by a prior art laser scanning system using a single laser beam directed to a raster polygon mirror. As shown, rather than being straight and parallel lines, laser scan lines 101-109 are arcs. Because each of laser scan lines 101-109 is produced by a different reflective facet of the raster polygon mirror rotating through the incident laser beam, and because each reflective facet produces a different degree of distortion, each of laser scan lines 101-109 is an arc with different curvature. Such distortion is primarily caused by asymmetrical rotation properties of the different reflective facets and by distortion of the scan-imaging optics that focus the laser on the imaging surface. Such distortion of laser scan lines 101-109 is generally visible to a viewer and can result in a degraded viewing experience.

As the foregoing illustrates, there is a need in the art for a laser-scanning system that produces straight and parallel laser scan lines on an image-generating surface using a raster-scanning polygon mirror.

SUMMARY OF THE INVENTION

One embodiment of the present invention sets forth a 2-D scanning system that uses a raster-polygon and specially-designed scan optics to produce straight scan-lines on an imaging surface. An approach angle of an incident light beam to the raster-scanning polygon mirror is selected to minimize pin-cushion distortion of scan lines on the imaging surface, and a tilt angle of the rotational axis of the raster-scanning polygon is selected to locate said distortion symmetrically on the imaging surface. In addition, a scan and imaging lens is configured to generate barrel distortion of scan lines on the imaging surface to compensate for pin-cushion distortion.

One advantage of the present invention is that a single high-speed rotational element can be used to achieve ultra-fast two-dimensional scanning of light onto an imaging surface with straight and parallel scan lines.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 2:
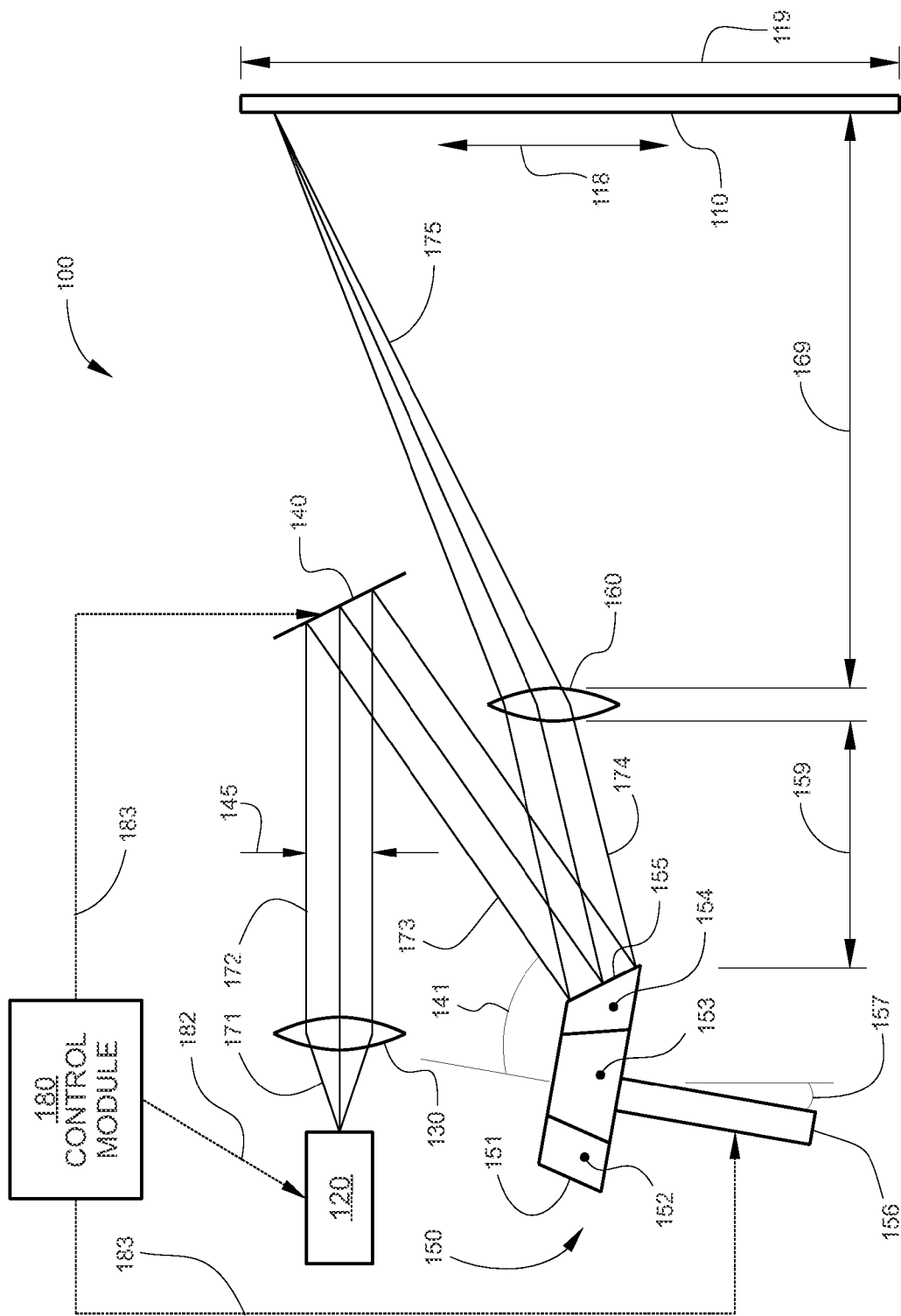
FIG. 2 is a schematic diagram of an imaging system configured according to embodiments of the invention.

FIG. 2 is a schematic diagram of a two-dimensional (2-D) scanning system 100 configured according to embodiments of the invention. 2-D scanning system 100 is a system that generates an image on a 2-D imaging surface 110 by scanning a single or multiple light beams across the surface of imaging surface 110 in a 2-D fashion. In some embodiments, 2-D scanning system 100 may be a laser-based display apparatus, such as a laser-phospor display (LPD) that uses a single or multiple lasers for optically exciting light-emitting or fluorescent materials on imaging surface 110 to generate an image. In other embodiments, 2-D scanning system 100 may be an electrostatic image printing machine, in which imaging surface 110 is a surface of a light-sensitive device. In the embodiment illustrated in FIG. 2, 2-D scanning system 100 is configured as an LPD, and includes imaging surface 110, a laser module 120, a collimating lens 130, an approach mirror 140, a raster polygon mirror 150, scan optics 160, and a control module 180 configured as shown.

Imaging surface 110 is the surface on which 2-D scanning system 100 generates a still or moving image. Imaging surface 110 includes alternating regions of phosphor-containing material that, when excited, produce light of different colors, e.g., red, green, and blue, where the produced colors are selected so that in combination said colors can form white light and other colors of light. The alternating regions may be stripes, dots, or other shapes. Pixel elements on imaging surface 110 include three different-colored phosphor-containing regions. Individual pixel elements may be defined by the size and shape of the alternating regions of phosphor-containing materials on imaging surface 110 and/or by the size of a focused beam 175 that excites the phosphor-containing materials. In one embodiment, the alternating regions of phosphor-containing material are narrow stripes.

Laser module 120 is a laser device such as laser tower that includes one or more laser diodes for producing excitation beams that scan across imaging surface 110 during operation of 2-D scanning system 100. In a preferred embodiment, multiple laser modules 120 are integrated into the system, forming superimposed collimated beams onto raster polygon mirror 150 with different incident angles. The number of laser modules so integrated could be 5, 10, 20, or more. For clarity, in FIG. 2 2-D scanning system 100 is illustrated and described with a single laser module 120 and a single laser beam, i.e., laser beam 171. In one embodiment, laser beam 171 is an ultraviolet (UV) laser producing light with a wavelength between about 400 nm and 450 nm. Laser beam 171 is a modulated light beam that is scanned across imaging surface 110 along two orthogonal directions, e.g., horizontally and vertically, in a raster scanning pattern to excite pixel elements on imaging surface 110 and produce an image for a viewer 105. The process of directing laser beam 171 to imaging surface 110 is described in greater detail below.

Collimating lens 130 is a single or compound lens configured to substantially collimate laser beam 171, thereby forming collimated beam 172. Collimating lens 130 is further configured to direct collimated beam 172 to approach mirror 140, as shown. In embodiments in which laser module 120 generates multiple laser beams, collimating lens 130 may be configured to collimate multiple laser beams. Alternatively, in such an embodiment, collimating lens 130 may be one of an array of collimating lenses that are each dedicated to a single input laser beam.

Approach mirror 140 is a reflective element positioned to receive and direct collimated beam 172 to raster polygon mirror 150 as an approach beam 173. Approach beam 173 is incident on raster polygon mirror 150 at an approach angle 141. Approach angle 141 is the angle formed between approach beam 173 and the optical axis 179 of scan optics 160. It is noted that due to the schematic nature of FIG. 2, approach angle 141 is not displayed to scale.

In some embodiments, a configuration of 2-D scanning system 100 is selected in which approach angle 141 is minimized, since a smaller approach angle 141 has been shown to reduce the asymmetric distortion that is present in laser scan lines traced on imaging surface 110. Note: asymmetric distortion of scan lines on imaging surface 110 is described below in conjunction with FIG. 3. A number of geometrical constraints come into play when determining a configuration of 2-D scanning system 100 in which approach angle 141 is minimized. For a particular configuration of 2-D scanning system 100, the magnitude of approach angle 141 selected for approach beam 173 may be determined based on height 119 of imaging surface 110, the beam width 145 of collimated beam 172, and the pupil distance 159 between raster polygon mirror 150 and scan optics 160. In some embodiments, approach mirror 140 is positioned between raster polygon mirror 150 and imaging surface 110, so that approach beam 173 is incident on the side of raster polygon mirror 150 facing imaging surface 110. In such embodiments, the optical path between laser module 120 and imaging surface 110 is "folded," thereby reducing the overall depth 106 of 2-D scanning system 100 and making 2-D scanning system 100 significantly more compact.

In some embodiments, 2-D scanning system 100 may include multiple laser modules 120. In such embodiments, laster beams generated by the multiple laser modules 120 may be slightly diverging rather than parallel with each other. In such embodiments, the magnitude of approach angle 141 may also be selected to position a convergence point of the multiple laser beams proximate raster polygon mirror 150 to optimize the reflection of the multiple laser beams of off raster polygon mirror 150.

Figure 1:
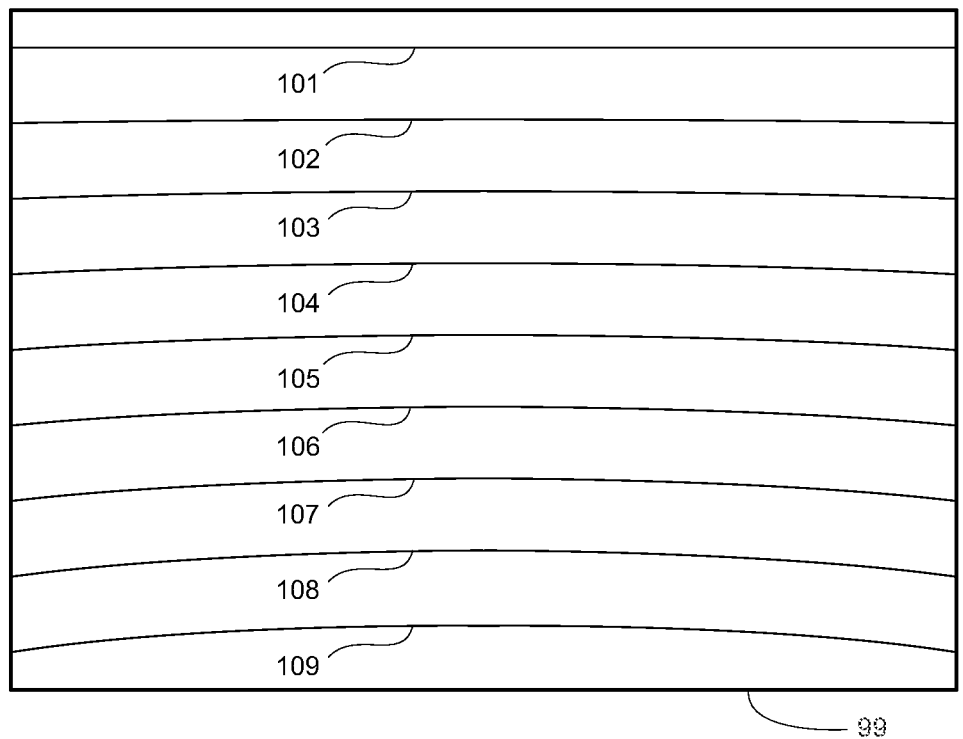
FIG. 1 illustrates curved laser scan lines produced on an imaging surface by a prior art laser scanning system using a single laser beam directed to a raster polygon mirror.

Raster polygon mirror 150 is a multi-faceted optical element having a plurality of reflective facets 151-155, where each reflective surface is inclined at a different angle with respect to rotational axis 156 of raster polygon mirror 150. For clarity, in FIG. 1 only five reflective facets 151-155 are depicted, but raster polygon mirror 150 may have more than or fewer than five reflective facets without exceeding the scope of the invention. As shown, approach beam 173 reflects off reflective facet 154 as a reflected beam 174, which passes through scan optics 160 and is converted to focused beam 175.

According to some embodiments of the invention, rotational axis 156 of raster polygon mirror 155 is positioned at a tilt angle 157 with respect to optical axis 179 of scan optics 160. Tilt angle 157 can be selected to optimize raster-polygon-system distortion to be symmetrical. Optimization of scan line distortion on image surface 110 is described in greater detail below in conjunction with FIGS. 3 and 4. In embodiments in which approach mirror 140 is positioned closer to imaging surface 110 than raster polygon mirror 150 is positioned to imaging surface 110, tilt angle 157 is inclined toward imaging surface 110. Tilting raster polygon mirror 150 toward imaging surface 110 facilitates directing reflected beam 174 through scan optics 160 and toward imaging surface 110.

In some embodiments, scan optics 160 comprise a compound lens configured to focus focused beam 175 on imaging surface 110 with minimal aberration at all points on imaging surface 110. In addition, according to embodiments of the invention, scan optics 160 are configured with a compensatory lens-distortion function, so that the laser scan lines followed by focused beam 175 are substantially straight lines rather than the arc-like paths that normally result when using a raster polygon for two-dimensional scanning. One configuration of scan optics 160 is described in greater detail below in conjunction with FIG. 5. In some embodiments, the lens elements of scan optics 160 are comprised of materials that are substantially transparent to a range of wavelengths that includes UV, visible, and infrared (IR) light, such as N-BK7 glass available from Schott North America of Elmsford, N.Y. In such embodiments, reflected beam 174 may include laser beams having UV and IR wavelengths without affecting performance of 2-D scanning system 100.

Scan optics 160 are positioned from raster polygon mirror 150 by an pupil distance 159 and from imaging surface 110 by a effective focus distance 169. Pupil distance 159 is primarily determined by approach angle 141 and the diameters of scan-optics 160. Effective focus distance 169 is determined by angular-and-linear magnification of 2-D scanning system 100.

Control module 180 is configured to perform control functions for and otherwise manage operation of 2-D scanning system 100. Such functions include receiving image data of an image to be generated and providing laser control signals 182 to laser module 120 based on the image data. In some embodiments, control module 180 is also configured to produce scanning control signals for controlling and synchronizing raster polygon mirror 150 and approach mirror 140, when approach mirror is a movable mirror. Control module 180 is also configured to individually pupil distance 159 modulate power applied to the one or more lasers in laser module 120 in order to adjust the output intensity of each light source as desired. Control module 180 may include one or more suitably configured processors, including a central processing unit (CPU), a graphics processing unit (GPU), a field-programmable gate array (FPGA), an integrated circuit (IC), an application-specific integrated circuit (ASIC), or a system-on-a-chip (SOC), among others, and is configured to execute software applications as required for the proper operation of 2-D scanning system 100. Control module 180 may also include one or more input/output (I/O) devices and any suitably configured memory for storing instructions for controlling normal and calibration operations, according to embodiments of the invention. Suitable memory includes a random access memory (RAM) module, a read-only memory (ROM) module, a hard disk, and/or a flash memory device, among others.

In operation, 2-D scanning system 100 forms images on imaging surface 110 by directing and focusing a single or multiple laser beams onto imaging surface 110 and modulating the output intensity of the laser beams to deliver a desired amount of optical energy to each of the three different-colored phosphor-containing regions that make up each pixel element on imaging surface 110. Each pixel element outputs light for forming a desired image by the emission of visible light created by the selective laser excitation of each phosphor-containing region in the pixel element. Consequently, modulation of the optical energy applied to, for example, the red, green, and blue portions of each pixel element by the incident laser beams controls the composite color and image intensity at each image pixel element. Together, laser module 120, collimating lens 130, mirror 140, raster polygon mirror 150, and scan optics 160 direct one or more light beams to imaging surface 110 and scan said beams both horizontally and vertically across imaging surface 110 to produce a 2-D image field. For the sake of description, "vertical" with respect to imaging surface 110 in FIG. 2 is defined as parallel to arrow 118 and "horizontal" with respect to imaging surface 110 is defined as perpendicular to the plane of the page.

To scan a laser beam across imaging surface 110, laser module 120 generates laser beam 171, which passes through and is collimated by collimating lens 130 to become collimated beam 172. Collimated beam 172 reflects off of approach mirror 140 as approach beam 173 and is incident on a reflective facet of raster polygon mirror 150 that is facing imaging surface 110, i.e., one of reflective facets 151-155. Reflected beam 174 passes through scan optics 160 to be converted to focused beam 175. As raster polygon mirror 150 rotates and the reflective facet receiving approach beam 173 moves relative to approach beam 173, focused beam 175 sweeps horizontally across imaging surface 110 to produce a series of scan lines on imaging surface 110. As each subsequent reflective facet rotates through approach beam 173, focused beam 175 sweeps horizontally across imaging surface 110 at a different vertical position, since each of reflective facets 151-155 is inclined at a different angle with respect to rotational axis 156.

As is well-known in the art, the use of a raster-scanning polygon mirror, such as raster polygon mirror 150, as a single scanning component to perform two-dimensional scanning ordinarily results in laser scan lines on the two-dimensional surface that are significantly and visibly distorted over an image plane rather than the preferred straight and parallel laser scan lines. Such distortion is commonly known as positive or "pin-cushion" distortion. According to embodiments of the invention, scan optics 160 are configured to compensate for said pin-cushion distortion by optimized polygon modeling system, introducing and equal and opposite distortion, i.e., negative or "barrel" distortion, into focused beam 175. A method of determining a desired configuration for scan optics 160 that compensates for pin-cushion distortion of polygon scanning on imaging surface 110 is described below in conjunction with FIG. 6.

Figure 3:
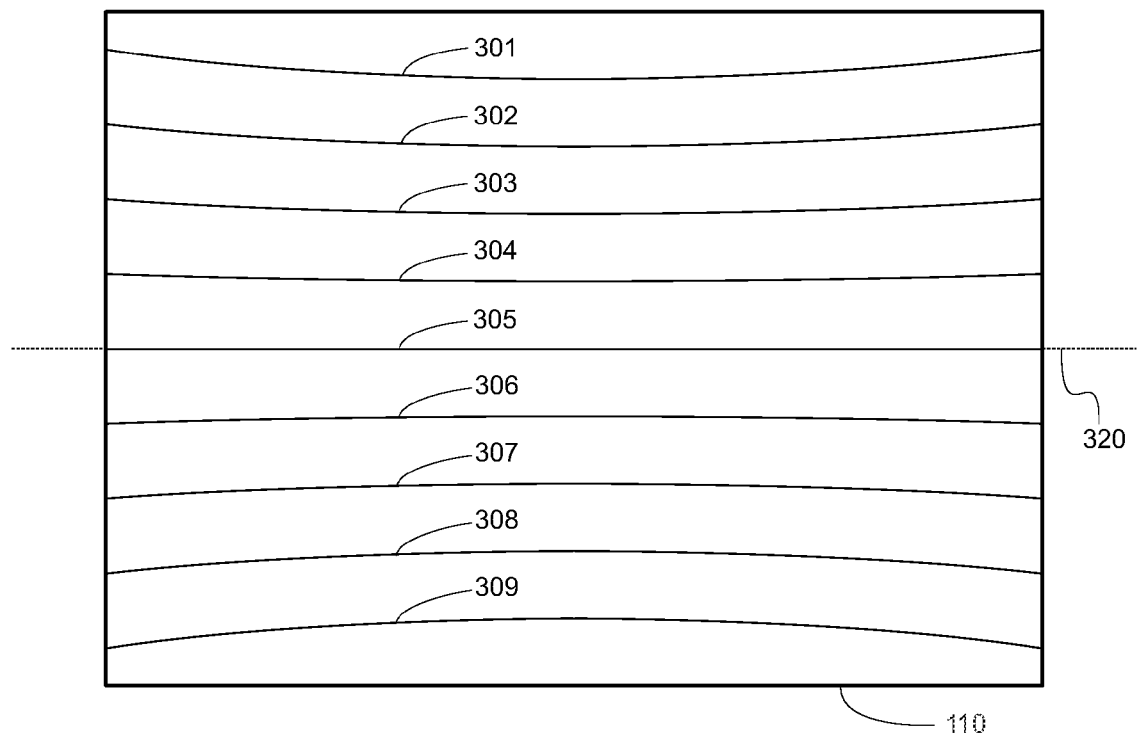
FIG. 3 illustrates symmetric curved scan lines generated by a raster-polygon modeling system with an optimum angle group having an approach angle and a polygon rotation axis tilt angle and an ideal scan lens without any distortion, according to an embodiment of the invention.

FIG. 3 illustrates laser scan lines 301-309 followed by focused beam 175 on imaging surface 110 when polygon-rotation-axis and approach angle are optimized, and scan optics 160 is an ideal lens without distortion. As shown, rather than being straight and parallel lines, laser scan lines 301-309 are arcs with positive distortion. As is known in the art, the pin-cushion distortion illustrated in FIG. 3 is primarily caused by the use of raster polygon mirror 150 to produce two-dimensional scanning of lasers onto imaging surface 110. According to embodiments of the invention, tilt angle 157 of rotational axis 156 is selected to optimize the positive distortion of laser scan lines 301-309 to be vertically symmetric on imaging surface 110. Specifically, tilt angle 157 is selected so that the arcing pattern produced by scan lines 301-309 on imaging surface 110 is positioned symmetrically, i.e., the centerline 320 of the "pin-cushion" is substantially aligned with the centerline of imaging surface 110. Consequently, scan lines 301-304, which occupy the top half of imaging surface 110, appear to be mirror images of scan lines 306-309, which occupy the bottom half of surface 110. Because the pin-cushion distortion pattern produced by scan lines 301-309 is positioned symmetrically on imaging surface 110, a configuration of scan optics 160 can be selected to compensate for said pin-cushion distortion using only spherical lens elements.

In short, approach beam 173, which is directed to raster polygon mirror 150 by approach mirror 140, is in the plane defined by rotational axis 156 of raster polygon mirror 150 and optical axis 179 of scan optics 160. This allows polygon-scanning distortion to be horizontally symmetric on imaging surface 110 in FIG. 2. This also results in polygon-scanning distortion that is vertically asymmetric on imaging surface 110, since approach angle 141 is greater than 0°. The asymmetric vertical distortion can be rendered symmetric by tilting rotational axis 156 toward approach mirror 140. With horizontally and vertically symmetric polygon-scanning distortion, one can design a symmetric optical system to substantially compensate for the residual symmetric distortion using symmetric optical components.

Figure 4:
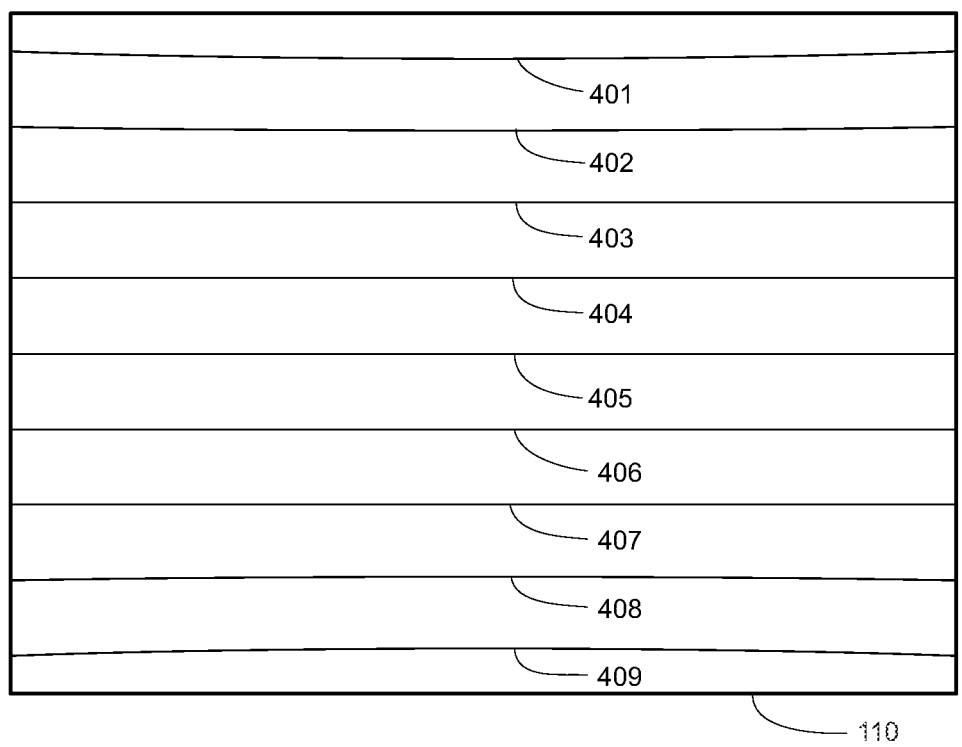
FIG. 4 illustrates laser scan lines on an imaging surface when a scan and imaging lens is configured to compensate for pin-cushion distortion, according to an embodiment of the invention.

FIG. 4 illustrates laser scan lines 401-409 on imaging surface 110 when scan optics 160 are configured to compensate for pin-cushion distortion, according to an embodiment of the invention. As shown, laser scan lines 401-409 are substantially straight and parallel lines rather than arcs. One of skill in the art will understand that laser scan lines 401-409 are not perfectly straight and parallel lines due to a small amount of residual distortion that stills remains at different locations, but such distortion is substantially undetectable by a viewer of 2-D scanning system 100. The scan-line straightness error can be easily controlled within a range of ¹⁄₁₀₀₀, e. g., 0.5 mm over a 500 mm scan line. Thus, according to embodiments of the invention, raster polygon mirror 150 can be used to produce two-dimensional scanning of one or more lasers onto a two-dimensional surface, i.e., imaging surface 110, without the significant drawback of producing visibly distorted laser scan lines. Further, when tilt angle 157 of raster polygon mirror 150 is selected to optimize the positive distortion of laser scan lines 401-409, i.e, by positioning the pin-cushion distortion pattern symmetrically on imaging surface 110, scan optics 160 can be configured with only spherical lens elements to compensate for said pin-cushion distortion.

Figure 5:
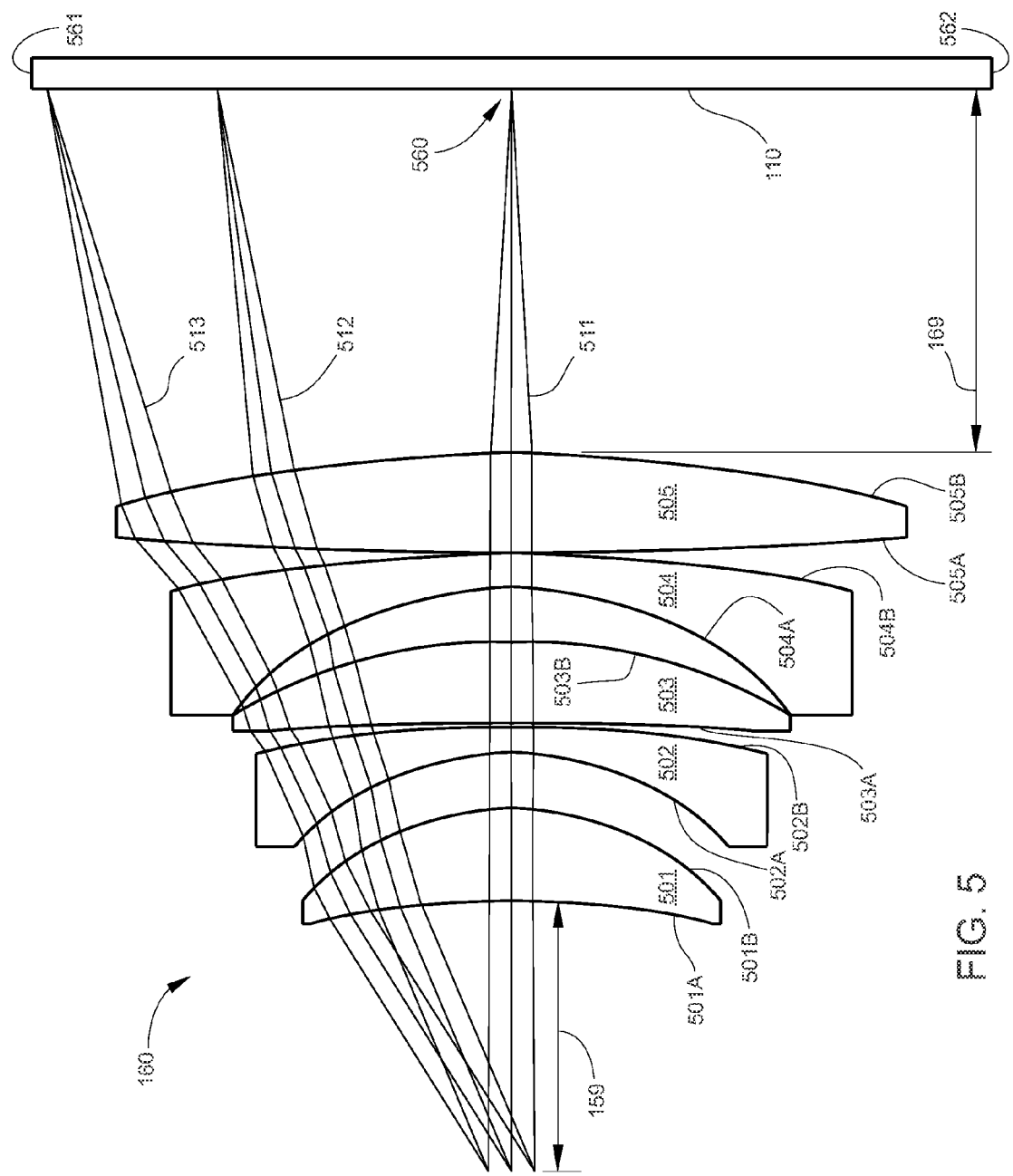
FIG. 5 schematically illustrates one embodiment of scan optics that are configured with a compensatory lens-distortion function, according to an embodiment of the invention.

FIG. 5 schematically illustrates one embodiment of scan optics 160 that is configured with a compensatory lens-distortion function, according to an embodiment of the invention. Because of this compensatory lens-distortion function, the laser scan lines followed by focused beam 175 on imaging surface 110 are substantially straight lines rather than the visibly curved paths that normally result from the use of a rotating raster polygon mirror. In addition, similar to scan lenses known in the art, scan optics 160 are configured to focus focused beam 175 on imaging surface 110 with minimal aberration at all points on imaging surface 110. In some embodiments, laser module 120 produces laser beams having wavelengths in the UV, IR, and/or visible bands. In such embodiments, the materials of elements 501-505 are substantially transparent in the desired wavelength band or bands. Light beams 511, 512, and 513 are shown in FIG. 5 to qualitatively illustrate the behavior of light beams that pass through scan optics 160 from different incident angles and are incident on imaging surface 110 at different vertical positions. Note: imaging surface 110, pupil distance 159, and effective focus distance 169 are not to scale.

In the embodiment illustrated in FIG. 5, scan optics 160 comprise a five-element compound lens that includes elements 501-505, where each of elements 501-505 has a specific function. Taken together, the functions of elements 501-505 focus light beams 511-513 on imaging surface 110 with minimal aberration and with a compensating barrel distortion that substantially cancels the pin-cushion distortion that is produced by other components of 2-D scanning system 100. In the embodiment illustrated in FIG. 5, elements 501-505 are each spherical elements, which are generally more manufacturable than aspherical optical elements. In addition, scan optics 160 are symmetrically positioned with respect to imaging surface 110, i.e., scan optics 160 are positioned such that a ray passing along the optical axis 550 of scan optics 160 also passes through a center point 560 of imaging surface 110. Center point 560 is equidistant from top edge 561 and bottom edge 562 of imaging surface 110 and is also equidistant from the left and right edges (not shown) of imaging surface 110. Because scan optics 160 are symmetrically positioned with respect to imaging surface 110, the full clear-aperture of each component in scan optics 160 can be effectively used when scanning focused beam 175 on imaging surface 110. One of skill in the art will appreciate that when the full aperture of scan optics 160 is used rather than a portion thereof, elements 501-505 can be more readily manufactured, since elements 501-505 can be significantly smaller for a given configuration of imaging system 110.

Element 501 is the first element of scan optics 160 through which reflected beam 174 passes. Element 501 includes surfaces 501A, 501B, and is configured to generate optical power of an incident beam with minimal aberration. Element 502 includes surfaces 502A, 502B, and is configured to compensate for on-axis aberrations introduced by Element 501. Element 503 and 504 include surfaces 503A, 503B and 504A, 504B, respectively, and are configured to compensate for off-axis residual aberrations introduced by elements 501 and 502, such as astigmatism and field curvature. Element 505 includes surfaces 505A, 505B, and is configured mainly as a compensating distortion element that generates enough negative, i.e., barrel, distortion to compensate for scan-line curvature of focused beam 175 introduced by using raster polygon mirror 150 to scan focused beam 175 on imaging surface 110. In some embodiments, element 505 is a positive, or converging, lens. In a preferred embodiment, the embodiment of scan optics 160 illustrated in FIG. 5 is a so-called "f-theta" lens, in which the position of the focused spot is dependent on the product of the focal length ("f") of the lens and the deflection angle ("theta") of focused beam 175 from being normal to imaging surface 110.

Given approach angle 141, pupil distance 159, effective focus distance 169, and the dimensions of imaging surface 110, one of skill in the art, upon reading the disclosure herein, can readily devise a configuration of elements 501-505 having the functionality described above. In such a configuration, each of elements 501-505 may vary from each other in one or more optical characteristics, including first surface radius, second surface radius, element thickness, glass type, dispersion, relative position to adjacent elements, index of refraction, and entrance pupil location. In some embodiments, the configuration of each of elements 501-505, i.e., the above optical characteristics for elements 501-505, are determined simultaneously, since all five elements work cooperatively to ensure proper focus and barrel distortion of light beams 511-513 on imaging surface 110.

By way of illustration, Table 1 sets forth one embodiment of scan optics 160 for a configuration of 2-D scanning system 100 in which effective focus distance 169 is approximately 550 mm, pupil distance 159 is approximately 35 mm, and imaging screen is approximately 400 mm×500 mm.

TABLE 1

| Surface | Radius | Index of Refraction (Nd) | Dispersion (Vd) | Glass Thickness |
|---|---|---|---|---|
| 501A | −148.46 | 1.4970 | 81.61 | 36 |
| 501B | −35.98 | | | 12.8 |
| 502A | −41.25 | 1.6204 | 60.34 | 3.8 |
| 502B | −158.93 | | | |
| 503A | −1149 | 1.6511 | 55.89 | 11.2 |
| 503B | −77.29 | | | |
| 504A | −49.6 | 1.6935 | 53.38 | 4.5 |
| 504B | −186.34 | | | |
| 505A | 643.04 | 1.4875 | 70.44 | 13.3 |
| 505B | −187.24 | | | |

In the embodiments described above in conjunction with FIGS. 3-5, the pin-cushion distortion of scan lines on imaging surface 110, such as the distortion illustrated in FIG. 3, is optimized with tilt angle 157 to generate said pin-cushion distortion symmetrically on imaging surface 110. In such embodiments, an ideal scan lens is adopted, instead of real scan optics. In other embodiments, the pin-cushion distortion of scan lines on imaging surface 110 is not optimized with tilt angle 157 of raster polygon mirror 150. Instead, an eccentric aspherical reflector or a partial lens is used to produce asymmetrical barrel distortion of scan lines that is equal-and-opposite to the asymmetrical pin-cushion distortion of scan lines produced by 2-D scanning system 100.

Figure 6:
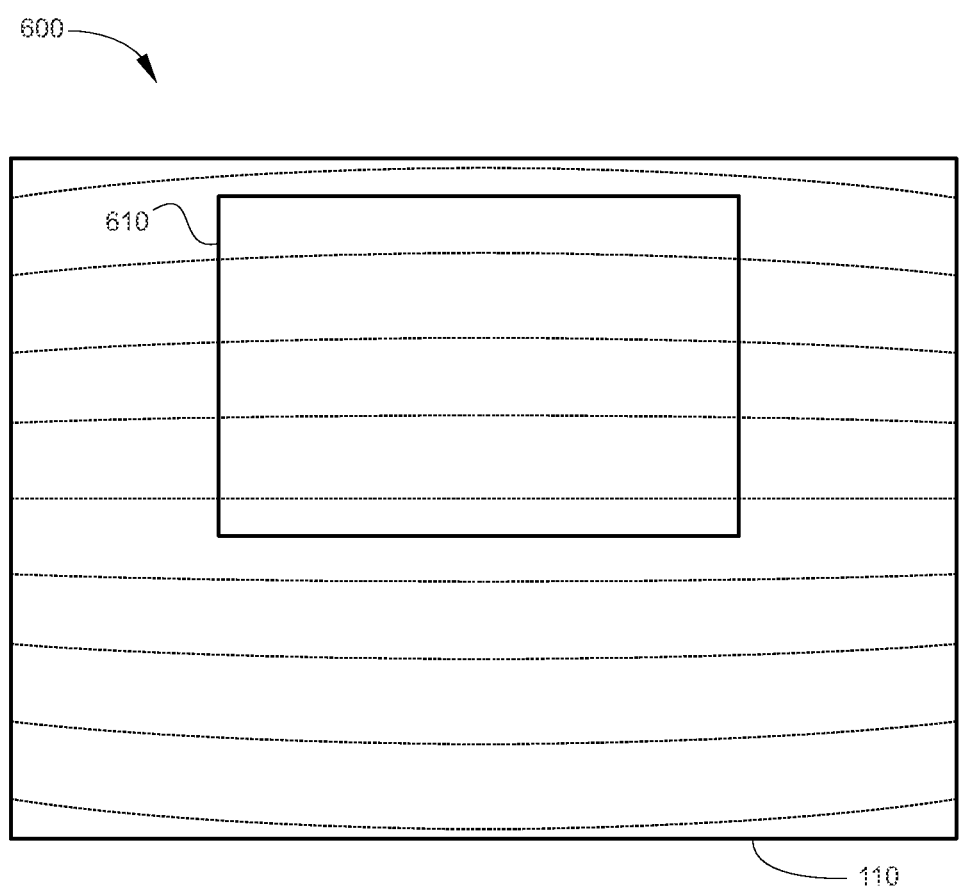
FIG. 6 illustrates a barrel distortion pattern generated by an embodiment of a scan and imaging lens that only includes spherical lens elements to compensate for the scanning-polygon-introduced distortion shown in FIG. 3.

For example, in one embodiment, a portion of a spherical lens system can be used to produce a desired asymmetrical barrel distortion of scan lines to compensate for a known quantity of asymmetrical pin-cushion distortion. FIG. 6 illustrates a barrel distortion pattern 600 generated by an embodiment of scan optics 160 that only includes spherical lens elements. As described above in conjunction with FIG. 4, a symmetrical barrel distortion pattern, such as barrel distortion pattern 600, may be used to compensate for the symmetrical pin-cushion distortion illustrated in FIG. 3, thereby producing straight and parallel laser scan lines 401-409 in FIG. 4. This is because centerline 320 of the pin-cushion distortion in FIG. 3 is substantially aligned with the centerline of imaging surface 110. In contrast, in embodiments in which the centerline of the pin-cushion distortion is not aligned with the centerline of imaging surface 110, and therefore is an asymmetrical pin-cushion pattern, only a portion of barrel distortion pattern 600 may be used to produce substantially straight and parallel scan lines on imaging surface 110. Specifically, a portion 610 of barrel distortion pattern 600 can be used to compensate for the asymmetrical pin-cushion distortion illustrated in FIG. 3.

In one embodiment, to produce portion 610 of barrel distortion pattern 600, scan optics 160 can be configured as a spherical lens system in which only a fraction of the lens system is used. In such an embodiment, the unutilized portion of the spherical lens system may be removed, such as when a larger lens system can mechanically interfere with other components in 2-D scanning system 100. Such an embodiment is illustrated in FIG. 2. In another embodiment, scan optics 160 may instead be configured with an eccentric aspherical reflector to produce portion 610 of barrel distortion pattern 600.

In some embodiments, approach mirror 140 is configured as a movable reflective element that can be quickly and precisely rotated to a desired orientation, such as a galvanometer mirror, a microelectromechanical system (MEMS) mirror, etc. In such embodiments, the orientation of mirror 140 alters approach angle 141 of approach beam 173 to raster polygon mirror 150. As one of skill in the art will appreciate, an alteration in approach angle 141 also changes the position on imaging surface 110 of the scan lines followed by focused beam 175. Thus, when approach mirror 140 is configured as a movable reflective element that can be quickly and precisely moved to multiple orientations, each orientation can direct focused beam 175 to different portions of imaging surface 110. In this way, a single laser beam can be used to illuminate more portions of imaging surface than when approach mirror 140 is fixed. One example of such an embodiment is illustrated in FIG. 7.

Figure 7:
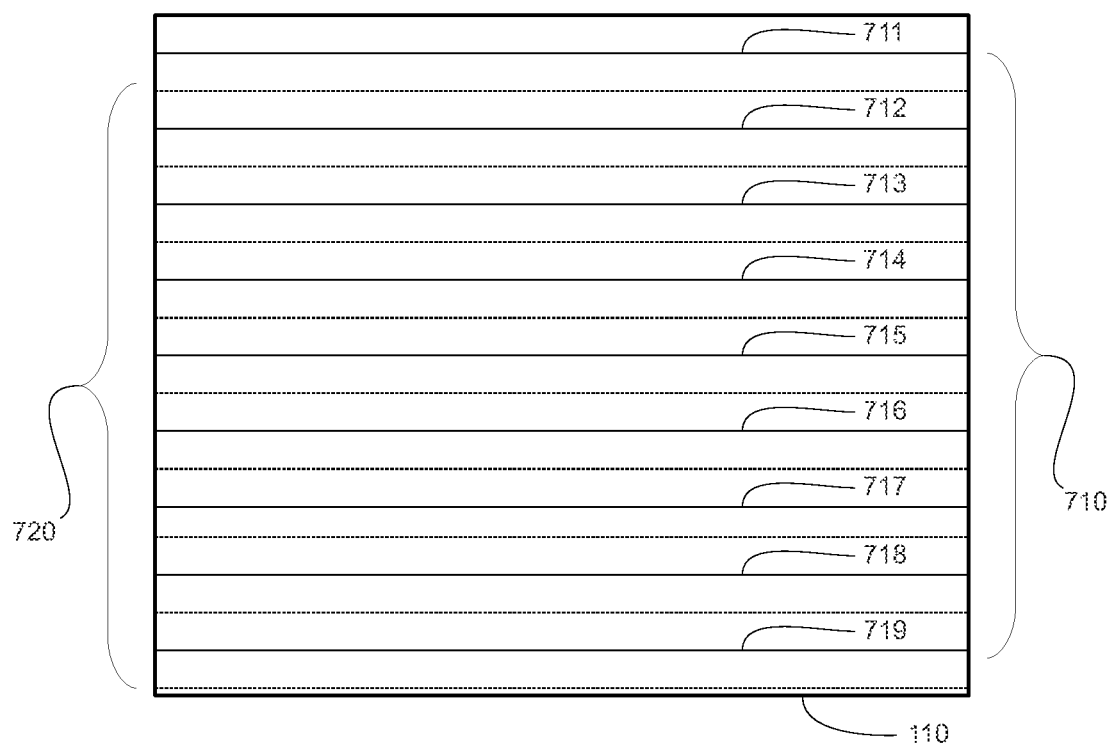
FIG. 7 schematically illustrates two sets of straight scan lines on an imaging surface, according to an embodiment of the invention.

FIG. 7 schematically illustrates two sets of scan lines on imaging surface 110, according to an embodiment of the invention. With movable approach mirror 140 in a first orientation, focused beam 175 follows a first set 710 of scan lines (solid lines) on imaging surface 110. As each reflective facet of raster polygon mirror 150 rotates through approach beam 173, focused beam 175 follows one of scan lines 711-719. With movable mirror 140 in a second orientation, focused beam 175 follows a second set 720 of scan lines (dashed lines) on imaging surface 110. In the embodiment illustrated in FIG. 7, the scan lines of first set 710 are interleaved with the scan lines of second set 720. Thus, movable approach mirror 140 can be used to increase the resolution and/or size of an image produced by 2-D scanning system 100 without increasing the number of lasers or other light sources in laser module 120.

Figure 8:
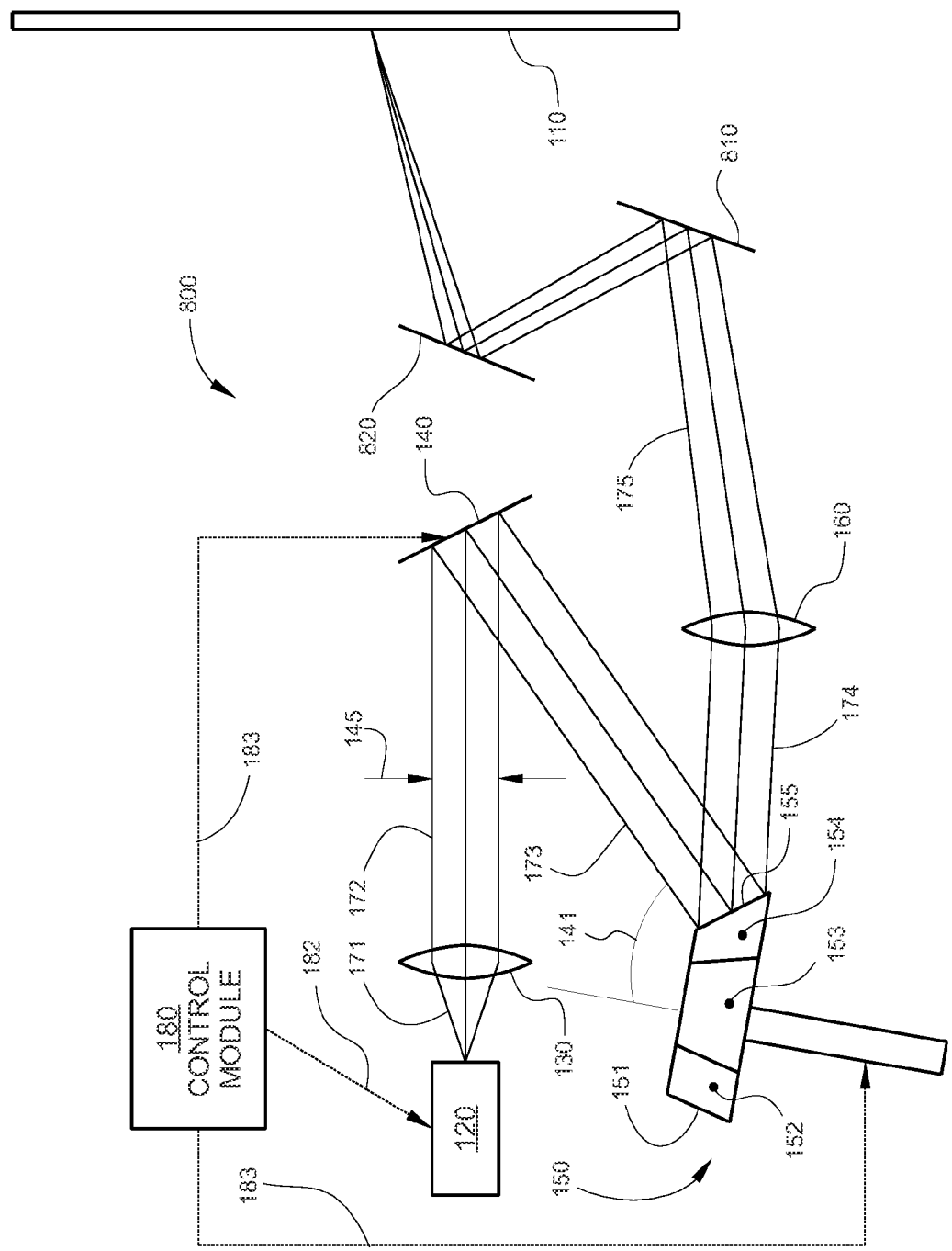
FIG. 8 schematically illustrates an imaging system that includes two folding mirrors, according to an embodiment of the invention.

In some embodiments, an imaging system may include one or more folding mirrors to provide a longer working distance between the scan and imaging lens and the imaging surface, improve the compactness of the imaging system, or both. FIG. 8 schematically illustrates an imaging system 800 that includes two folding mirrors 810, 820, according to an embodiment of the invention. Folding mirrors 810, 820 are positioned in the optical path between scan optics 160 and imaging surface 110, and are configured to direct focused beam 175 to imaging surface 110.

As noted above, in some embodiments, 2-D scanning system 100 may include multiple laser modules 120 that together produce a plurality of substantially parallel laser beams, rather than a single laser beam 171 as depicted in FIG. 2. For example, 2-D scanning system 100 may include 5, 10, 20, or more laser modules, according to some embodiments of the invention. In such embodiments, each of scan lines 301-309 illustrated in FIG. 3 and scan lines 401-409 illustrated in FIG. 4 represents a path followed by a single laser beam, rather than the paths followed by all laser beams generated by laser module 120. For example, in one embodiment, each scan line illustrated in FIGS. 3 and 4 represents a path followed by the centermost laser beam generated by laser module 120.

Figure 9:
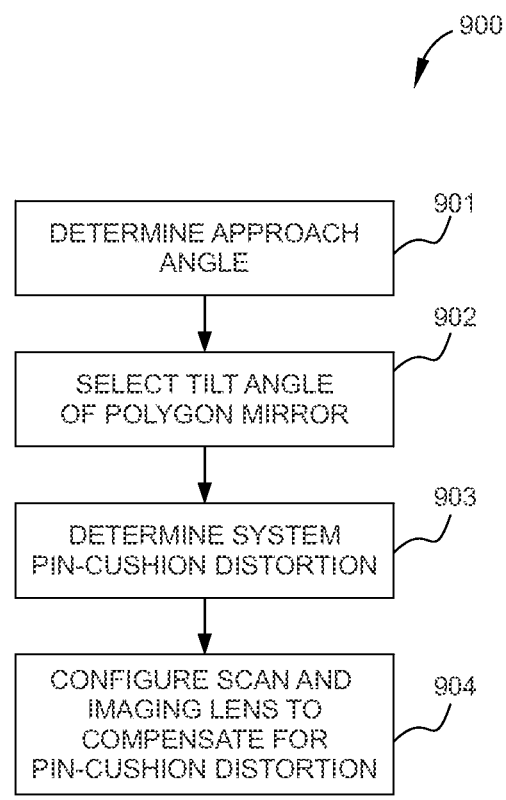
FIG. 9 sets forth a flowchart of method steps for determining the configuration of a scan and imaging lens, according to embodiments of the invention.

FIG. 9 sets forth a flowchart of method steps for determining the configuration of scan optics 160, according to embodiments of the invention. Although the method steps are described with respect to 2-D scanning system 100 of FIG. 2, persons skilled in the art will understand that performing the method steps to determine the configuration of a scan and imaging lens in any imaging system using a raster-scanning polygon is within the scope of the invention. Prior to the start of the method 900, a general configuration of 2-D scanning system 100 is determined, including the size of imaging surface 110 and the relative positions of laser module 120, raster polygon mirror 150, and scan optics 160.

As shown, method 900 begins at step 901, where approach angle 141 is determined. Because a small approach angle 141 produces less asymmetric distortion of scan lines on imaging surface 110, in some embodiments the location and orientation of approach mirror 140 is selected to create the smallest practical approach angle 141, given a specific geometry of 2-D scanning system 100. The magnitude of approach angle 141 may be determined based on height 119 of imaging surface 110, the beam width 145 of collimated beam 172, and pupil distance 159 between raster polygon mirror 150 and front components of scan optics 160. In embodiments of the invention in which approach mirror 140 is positioned between raster polygon mirror 150 and imaging surface 110, approach angle 141 may be about 30° to 45°.

In step 902, tilt angle 157 of rotational axis 156 is selected to optimize distortion of laser scan lines followed by focused beam 175 on imaging surface 110. Specifically, based on approach angle 141, tilt angle 157 can be selected so that the distortion of scan lines on imaging surface 110 is symmetrical. In one embodiment, optical modeling software known in the art can be used to predict scan-line shapes on a screen, and, through ray-tracing, determine an optimal value of tilt angle 157 to position the pattern of pin-cushion distortion symmetrically on imaging surface 110. Given approach angle 141 as determined in step 901, and ideal scan optics 160, one of ordinary skill in the art can readily determine such an optimal value of tilt angle 157 using such a process. In such an embodiment, ideal scan optics 160 are assumed to be free of aberration.

In step 903, the degree of pin-cushion distortion introduced into 2-D scanning system 100 by raster polygon mirror 150 is determined. Optical modeling software known in the art, such as a scan-line ray-tracing algorithm, can be used to predict the scan-line shapes that are followed by focused beam 175 on imaging surface 110. In this way, symmetric pin-cushion scan-line distortion introduced into 2-D scanning system 100 by raster polygon mirror 150 can be quantified. In embodiments in which laser module 120 produces multiple laser beams, scan lines corresponding to the path followed by one or more representative lasers may be predicted in step 903, rather than predicting the scan lines for all laser beams generated by laser module 120.

In step 904, scan optics 160 are configured to produce equal and opposite scan-line distortion in focused beam 175 to that predicted to be present in 2-D scanning system 100 in step 903. Thus, scan optics 160 are configured to produce a specific amount of negative, or barrel, distortion in focused beam 175 to compensate for the positive, or pin-cushion, distortion of focused beam 175 determined in step 903 to be present in 2-D scanning system 100.

Figure 10:
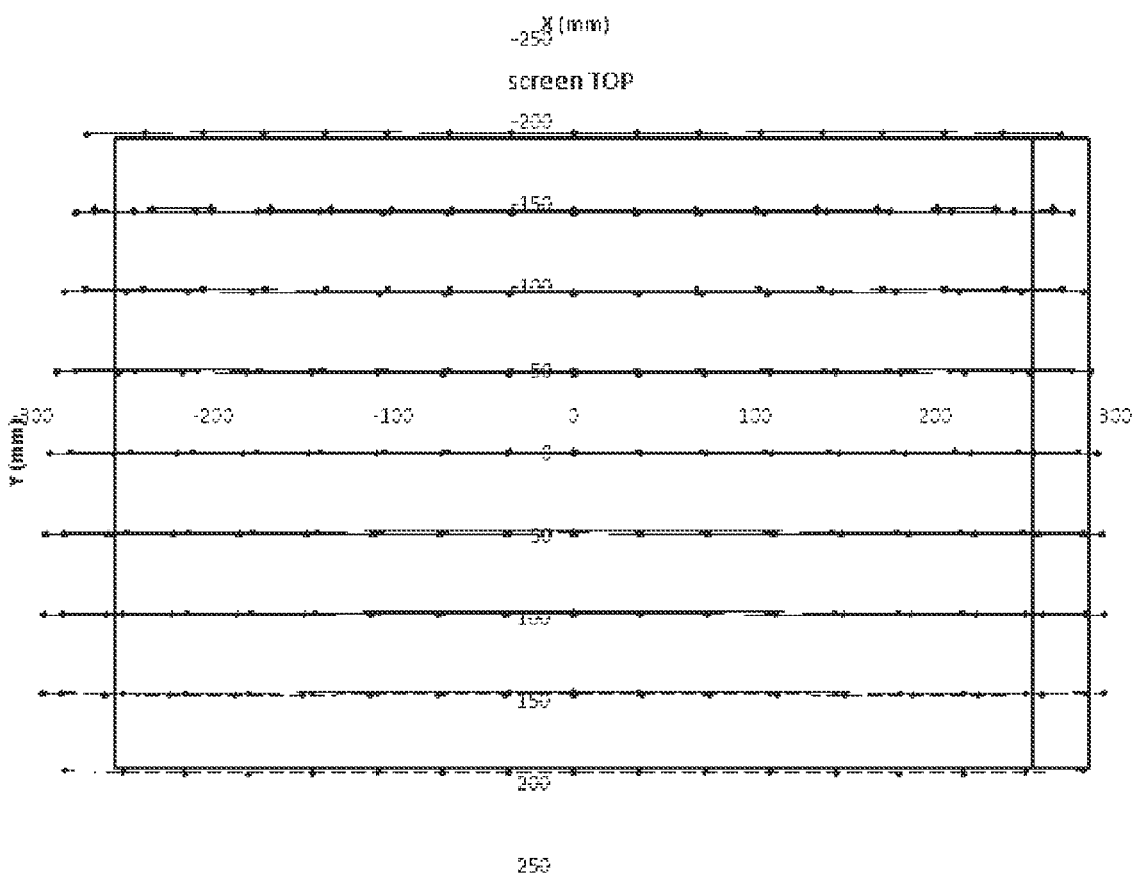
FIG. 10 is an example of a ray-tracing scan-line diagram illustrating scan lines produced on a screen by embodiments of the invention.

FIG. 10 is an example of a ray-tracing scan-line diagram illustrating scan lines produced on a screen by embodiments of the invention. FIG. 10 was generated with a scan-line ray-tracing macro over a 20"×15" imaging screen. As shown, laser scan lines across the screen are substantially straight and parallel lines rather than arcs. Specifically, embodiments of the invention can achieve straightness accuracy of 0.5 mm over a 500 mm long scan line on imaging surface 110, such as one of laser scan lines 401-409 in FIG. 4. Thus, embodiments of the invention can produce line straightness on an imaging surface using a single scanning component to achieve a straightness error of $\frac{1}{1000}$. The embodiment of scan optics 160 is configured as an f-theta lens.

Figure 11:
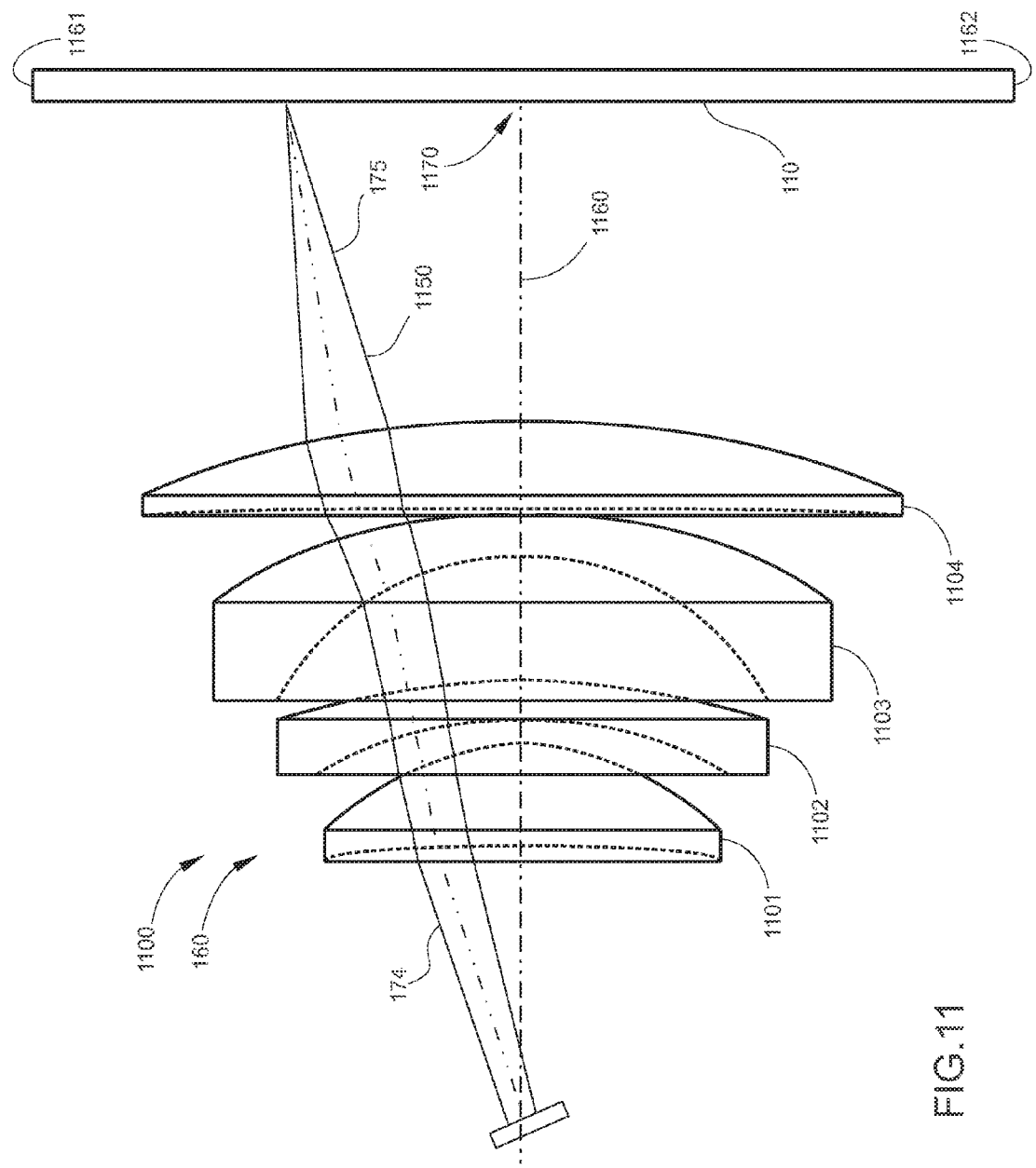
FIG. 11 schematically illustrates another embodiment of scan optics that are configured with a compensatory lens-distortion function, according to an embodiment of the invention.

FIG. 11 schematically illustrates another embodiment 1100 of scan optics 160 that is configured with a compensatory lens-distortion function, according to an embodiment of the invention. Similar to the embodiment of scan optics 160 illustrated in FIG. 11, the laser scan lines followed by focused beam 175 on imaging surface 110 are substantially straight lines due to the compensatory lens-distortion function. Similar to scan lenses known in the art, embodiment 1100 of scan optics 160 is configured to focus focused beam 175 on imaging surface 110 with minimal aberration at all points on imaging surface 110. Light beam 1150 is shown in FIG. 11 to qualitatively illustrate the behavior of light beams that pass through embodiment 1100 of scan optics 160 and are directed to imaging surface 110.

In embodiment 1100 illustrated in FIG. 11, scan optics 160 comprise a four-element compound lens that includes elements 1101-1104, where each of elements 1101-1104 has a specific function. Taken together, the functions of elements 1101-1104 focus light beam 1150 on imaging surface 110 with minimal aberration and with a compensating barrel distortion that substantially cancels the pin-cushion distortion that is produced by other components of 2-D scanning system 100. In the embodiment illustrated in FIG. 11, elements 1101-1104 are each spherical elements, which are generally more manufacturable than aspherical optical elements. In addition, scan optics 160 are symmetrically positioned with respect to imaging surface 110, i.e., scan optics 160 are positioned such that a ray passing along the optical axis 1160 of scan optics 160 also passes through a center point 1170 of imaging surface 110. Center point 1170 is equidistant from top edge 1161 and bottom edge 1162 of imaging surface 110 and is also equidistant from the left and right edges (not shown) of imaging surface 110. Besides the advantage described above for the embodiment of scan optics 160 illustrated in FIG. 5, embodiment 1100 only includes 4 elements, and is therefore easier-to fabricate and assemble. In addition, embodiment 1100 is generally more compact than embodiments of scan optics using five or more elements.

Element 1101 is the first element of embodiment 1100 through which reflected beam 174 passes. Element 1101 is configured to generate optical power of an incident beam with minimal aberration. Element 1102 is configured to compensate for on-axis aberrations introduced by Element 1101. Element 1103 is configured to compensate for off-axis residual aberrations introduced by elements 1101 and 1102, such as astigmatism and field curvature. Element 1104 is configured mainly as a compensating distortion element that generates enough negative, i.e., barrel, distortion to compensate for scan-line curvature of focused beam 175 introduced by using raster polygon mirror 150 to scan focused beam 175 on imaging surface 110. In some embodiments, element 1104 is a positive, or converging, lens. It is noted that embodiment 1100 of scan optics is configured as an f-theta lens.

Given approach angle 141, pupil distance 159, effective focus distance 169, (shown in FIG. 2) and the dimensions of imaging surface 110, one of skill in the art, upon reading the disclosure herein, can readily devise a configuration of elements 1101-1104 having the functionality described above. In such a configuration, each of elements 1101-1104 may vary from each other in one or more optical characteristics, including first surface radius, second surface radius, element thickness, glass type, dispersion, relative position to adjacent elements, index of refraction, and entrance pupil location. In some embodiments, the configuration of each of elements 1101-1104, i.e., the above optical characteristics for elements 1101-1104, are determined simultaneously, since all four elements work cooperatively to ensure proper focus and barrel distortion of light beams 1111-1104 on imaging surface 110.

In sum, embodiments of the invention set forth a scanning system that uses only one quickly-rotating component, i.e., a raster-polygon, to produce 2-D straight scan lines on an imaging surface. One advantage of the present invention is that a single rotational element can be used to achieve two-dimensional scanning of light onto an imaging surface with straight and parallel scan lines.

While the foregoing is directed to embodiments of the present invention, other and further embodiments of the invention may be devised without departing from the basic scope thereof, and the scope thereof is determined by the claims that follow.

We claim:

1. A system of scanning beams, comprising:
   a scan optics module, wherein the scan optics module is configured according to a compensatory lens-distortion function, wherein the scan optics module is configured to compensate for a pin-cushion distortion and use only spherical lens elements, wherein the scan optics module receives multiple light beams at an approach angle and propagates the multiple light beams, such that the multiple light beams are substantially straight and parallel to each other as the multiple light beams scan across a first portion of an imaging surface;
   a light source module containing multiple light sources positioned to direct the multiple light beams to a raster polygon, wherein the light sources are positioned at an incident approach angle that is in a plane defined by the rotational axis of the raster polygon, wherein each incident beam is at a different incident approach angle, wherein the incident approach angle is greater than 0 degrees;
   the raster polygon having a first facet position and a second facet position wherein the first facet position and the second facet position is inclined at a different angle with respect to the raster polygon rotational axis, wherein each facet position reflects the multiple light beams and establishes distinct sets of reflected multiple light beams, wherein each set of reflected multiple light beams are substantially straight and parallel to each other, wherein the raster polygon rotates with a rotating axis tilt, wherein the raster polygon rotating axis tilt is tilted towards the scan optics module, wherein the tilt axis is based on an approach angle and pupil distance between a raster polygon mirror and the scan optics module;
   a display screen, wherein the display screen images a portion of an image at a first portion of the screen from the first set of multiple light beams, wherein the display screen images a distinct second portion of an image at a distinct second portion of the screen from the second set of multiple light beams, and wherein the beams scanned across the first and second regions are substantially straight wherein the magnitude of the approach angle is determined based on a height of the imaging surface, the beam width of an approach beam, and the pupil distance between the raster polygon mirror and the scan optics module.

2. The system of claim 1, wherein the display screen is on a side of the scan optics module opposite the raster polygon.

3. The system of claim 1, wherein the center point of the scan optics module and the center point of the display screen are such that the center points are equidistance from a top edge and a bottom edge of the display screen and are equidistant from a top edge and a bottom edge of the scan optics module pupil and are also equidistant from left and right edges of the scan optics pupil.

4. The system of claim 1, wherein the scan optics module comprises a scan lens consisting of spherical lens elements.

5. The system of claim 4, wherein the scan lens is positioned in the optical path between the raster polygon and the display screen such that a light ray directed along an optical axis of the scan lens is incident on a center point of the imaging surface display screen that is equidistant from a left edge and a right edge of the display screen and equidistant from a top edge and a bottom edge of the display screen.

6. The system of claim 4, wherein the scan lens comprises a five-element lens.

7. The scanning system of claim 6, wherein the five-element lens is configured as a compensating distortion lens to generate the barrel distortion of the multiple scan lines.

8. The scanning system of claim 4, wherein the scan lens comprises a four-element lens configured as a compensating distortion lens to generate the barrel distortion of the multiple scan lines.

9. The system of claim 4, wherein barrel distortion introduced by the scan lens compensates for pin-cushion distortion of multiple scan lines such that the multiple scan lines are substantially straight and parallel lines across the entire display screen.

10. The system of claim 1, further comprising a reflective element disposed in an optical path between the light source module and the raster polygon, wherein the reflective element is positioned closer to the display screen than the rotatable raster polygon is positioned to the display screen.

11. The system of claim 10, wherein the reflective element is configured to move between a first orientation that directs multiple light beams along a first set of scan lines on a first portion of the display screen as the raster polygon rotates and a second orientation that directs the multiple light beams along a second set of scan lines on a distinct second portion of the display screen as the raster polygon rotates.

12. The system of claim 11, wherein scan lines of the first set of scan lines are interleaved between scan lines of the second set of scan lines.

13. The system of claim 10, wherein the tilt angle is selected so that a pin-cushion distortion pattern produced by the multiple scan lines on the imaging surface is positioned symmetrically so that a centerline of the pin-cushion distortion pattern is substantially aligned with the centerline of the display screen.

* * * * *